（12） United States Patent
Kwag et al.

(10) Patent No.: US 7,289,413 B2
(45) Date of Patent: Oct. 30, 2007

(54) DATA SLICER AND DATA SLICING METHOD FOR OPTICAL DISC SYSTEM

(75) Inventors: Sung-mok Kwag, Yongin (KR); Tae-hyeon Sim, Yongin (KR)

(73) Assignee: Samsung Electronics Co., Ltd. (KR)

( * ) Notice: Subject to any disclaimer, the term of this patent is extended or adjusted under 35 U.S.C. 154(b) by 582 days.

(21) Appl. No.: 10/639,668

(22) Filed: Aug. 12, 2003

(65) Prior Publication Data

US 2004/0042368 A1 Mar. 4, 2004

(30) Foreign Application Priority Data

Aug. 30, 2002 (KR) ............. 10-2002-0051972

(51) Int. Cl.
 *G11B 20/10* (2006.01)
(52) U.S. Cl. .................. 369/59.17; 369/47.35
(58) Field of Classification Search ........... None
 See application file for complete search history.

(56) References Cited

U.S. PATENT DOCUMENTS

| 5,469,091 | A | * | 11/1995 | Takahashi et al. | ............. 327/73 |
| 5,592,456 | A | * | 1/1997 | Miyashita et al. | ....... 369/59.18 |
| 5,710,750 | A | * | 1/1998 | Tachibana | ................ 369/59.16 |
| 6,188,738 | B1 | * | 2/2001 | Sakamoto et al. | .......... 375/371 |
| 6,631,103 | B1 | * | 10/2003 | Yamanoi et al. | ......... 369/47.17 |

* cited by examiner

*Primary Examiner*—William Korzuch
*Assistant Examiner*—Tawfik Goma
(74) *Attorney, Agent, or Firm*—Mills & Onello LLP

(57) ABSTRACT

In a data slicer and data slicing method for an optical disc system, the data slicer for converting an analog input signal into a digital signal includes a comparator, a duty detector, and a low pass filter. The comparator compares the analog input signal with a feedback signal to generate the digital signal. The duty detector detects the duty of the digital signal. If the detected duty is longer than a preset duration, the duty detector converts the detected signal into a signal having the preset duration, and outputs the converted signal. The low pass filter integrates the output signal of the duty detector to generate the feedback signal.

18 Claims, 8 Drawing Sheets

DATA SLICER AND DATA SLICING METHOD FOR OPTICAL DISC SYSTEM

BACKGROUND OF THE INVENTION

This application claims the priority of Korean Patent Application No. 2002-51972, filed on Aug. 30, 2002, in the Korean Intellectual Property Office, the disclosure of which is incorporated herein in its entirety by reference.

1. Field of the Invention

The present invention relates to an optical disc system, and more particularly, to a data slicer, which converts an analog signal extracted from an optical disc into a digital signal, and a data slicing method for an optical disc reproducer.

2. Description of the Related Art

FIG. 1 is a schematic block view of a standard optical disc reproducer. As shown in FIG. 1, the optical disc reproducer includes an RF unit 110 for receiving a signal reflected from an optical disc in order to output an analog signal, a data slicer 120 for receiving the analog signal outputted from the RF unit 110 in order to estimate a median value of the analog signal and convert the analog signal into a digital signal using the median value, and a digital signal processing unit 130 for processing the digital signal output from the data slicer 120 in order to restore information from the signal. In addition to the above components, the optical disc reproducer further includes a motor unit 140 for mechanically controlling the optical disc, among other functions.

FIGS. 2 and 3 are circuit views of one example of a data slicer according to the prior art.

A data slicer shown in FIG. 2 includes a comparator 210, a phase locked loop (PLL) 220, a low pass filter 230, and an amplifier 240.

The comparator 210 compares an analog input signal AIN input from the RF unit 110 (refer to FIG. 1) with a predetermined feedback signal FB and outputs a digital signal EFMCOMP based on the comparison result. The PLL 220 receives the digital signal EFMCOMP and generates a channel clock signal PLCK having a channel period T. The low pass filter 230 low-pass filters the digital signal EFMCOMP, and the amplifier 240 amplifies the low-pass filtered digital signal to generate the feedback signal FB that is input to a negative terminal of the comparator 210.

The low pass filter 230 functions as an integrator unit. That is, the median value of the analog input signal AIN is estimated by integrating the digital signal EFMCOMP. The estimated median value is fed back to the comparator 210 through the amplifier 240 and is compared with the analog input signal AIN, and thus, the estimated median value is used as a slice level. The slice level is referred to as a base level for converting the analog input signal AIN into a digital signal such as a high level (1) and a low level (0). The slice level must be set at a center of an eye pattern of the analog input signal AIN. If the slice level deviates at the center of the eye pattern, an error is generated in the pulse widths at the high level and the low level when the analog input signal AIN is converted into the digital signal EFMCOMP so that there is a high possibility of generating a data error.

An enhanced data slicer, such as the one shown in FIG. 3, further includes a charge pump 250 in addition to the components of the data slicer shown in FIG. 2.

In this embodiment, if the digital signal EFMCOMP is at a high level, a switch SW1 of the charge pump 250 is turned "OFF" and a switch SW2 of the charge pump 250 is turned "ON." In this case, current flows from an output node of the charge pump 250 to ground so that a voltage charged to a capacitor CP is reduced, and thus, the signal level input to the low pass filter 230 is lowered. If the digital signal EFMCOMP is at a low level, the switch SW1 is turned "ON" and the switch SW2 is turned "OFF." In this case, current is supplied from the power supply voltage and the capacitor CP is charged with the voltage so that the signal level input to the low pass filter 230 is raised.

Thereafter, since the charge pump 250 lowers the peak-to-peak level of the digital signal EFMCOMP, the charge pump 250 functions to reduce a design feature, particularly, the bandwidth of the low pass filter 230 connected to the rear end of the charge pump 250.

However, the data slicer of the prior art shown in FIGS. 2 and 3 has a high possibility of generating a data error, in the case where the eye pattern of the analog input signal ALN is asymmetrical.

FIG. 4 is a waveform diagram of an analog input signal. Generally, a waveform of an analog input signal is referred to as an eye pattern. In FIG. 4, 11T is referred to as a signal have a relatively long swing width, and 3T is referred to as a signal having a relatively small swing width.

A compact disc (to be referred to as hereinafter as a CD) system or a digital versatile disc (to be referred to hereinafter as a DVD) system modulates information data using an EFM (Eight-to-Fourteen Modulation) and stores the modulated data. In the case of the CD, an EFM signal is a pulse signal having a period of 3T to 11T (T is a channel clock period), and in the case of the DVD, an EFM signal is a pulse signal having a period of 3T to 14T. Thus, when it is considered that the CD is the base, an analog input signal reproduced from an optical disc corresponds to any one of the signals having a period of 3T to 11T.

In FIG. 4, (a) presents the case where the center level of an 11T signal is identical with the center level of a 3T signal. FIG. 4(b) presents the case where the center level of the 3T signal has a positive value with respect to the center level of the 11T signal. That is, FIG. 4(b) shows the case where positive asymmetry occurs. On the other hand, FIG. 4(c) presents the case where the center level of the 3T signal has a negative value with respect to the center level of the 11T signal. That is, FIG. 4(c) shows the case where negative asymmetry occurs.

In the case where the amount of recording power is inappropriate when data is recorded to the disc, or in the case where pit asymmetry occurs during manufacturing the disc, etc., asymmetry in the analog input signal is generated as in FIGS. 4(b) and 4(c).

The data slicers according to the prior art shown in FIGS. 2 and 3 estimate the median values of all of the 3T signals through the 11T signals. Thus, median values of the signals with the relative long pulse width (11T signal or signals near to the 11T signal) greatly affect the median values of all of the signals.

In a case where an analog input signal is asymmetrical as in FIGS. 4(b) and (c), and if the median value of the 11T signal is used as a slice level and the median value of the 11T signal is applied to the 3T signal, a large number of errors are generated in the pulse widths at the high level and low level of the 3T signal. Note that an error is not generated in restoring data only in the case where the analog input signal is symmetrical. However, as shown in FIGS. 4(b) and (c), when it is considered that the 11T signal is the base, the pulse width at the low level of the 3T signal is longer than that of the high level, or the pulse width at the high level of the 3T signal is longer than that of the low level. As a result, there is a high possibility of generating a data error in restoring data.

Thus, since median values of signals with a relative small pulse width (3T signal or signals near to the 3T signal) cannot be accurately estimated in the prior art, it is difficult to restore data accurately, whereby there is a high possibility of generating a data error.

SUMMARY OF THE INVENTION

The present invention provides a data slicer for reducing the possibility of generating data errors in an optical disc reproducer.

The present invention also provides a data slicing method for reducing the possibility of generating data errors in an optical disc reproducer.

According to an aspect of the present invention, there is provided a data slicer for converting an analog input signal into a digital signal in an optical disc system. The data slicer comprises a comparator for comparing the analog input signal with a feedback signal to generate the digital signal; a duty detector which detects the duty of the digital signal, and if the detected duty is longer than a preset duration, converts the detected signal into a signal having the preset duration, and outputs the converted signal; and a low pass filter for integrating the output signal of the duty detector to generate the feedback signal.

Preferably, the data slicer further comprises a high pass filter for removing low frequency noise components from the analog input signal.

According to another aspect of the present invention, there is provided a data slicer for converting an analog input signal into a digital signal in an optical disc system. The data slicer comprises a comparator which compares the analog input signal with a slice level to generate a digital signal at a first level or a digital signal at a second level according to a comparison result; a duty detector which detects the duty of the digital signal whenever the logic level of the digital signal is changed, outputs the digital signal when the detected duty is equal to or shorter than a preset duration, and outputs a digital signal at a third level during a period beyond the preset duration when the detected duty is longer than the preset duration; and a slice level estimating unit which receives the output signal of the duty detector to estimate and output the slice level.

Preferably, the slice level estimating unit includes a low pass filter for integrating the output signal of the duty detector.

According to another aspect of the present invention, there is provided a method for slicing data for converting an analog input signal into a digital signal in an optical disc system. The method comprises (a) comparing the analog input signal with a feedback signal to generate the digital signal; (b) detecting the duty of the digital signal, and if the detected duty is longer than a preset duration, converting the detected signal into a signal having the preset duration, and outputting the converted signal; and (c) integrating the output signal of a duty detector to generate the feedback signal.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF PREFERRED EMBODIMENTS

Figure 1:
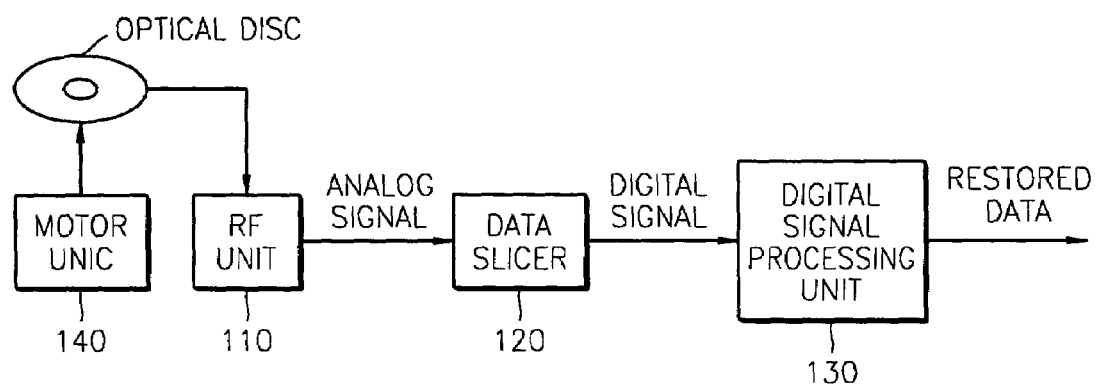
FIG. 1 is a schematic block diagram of a general optical disc reproducer.

The present invention will now be described more fully with reference to the accompanying drawings, in which preferred embodiments of the invention are shown. The same reference numerals in different drawings represent the same element.

Figure 5:
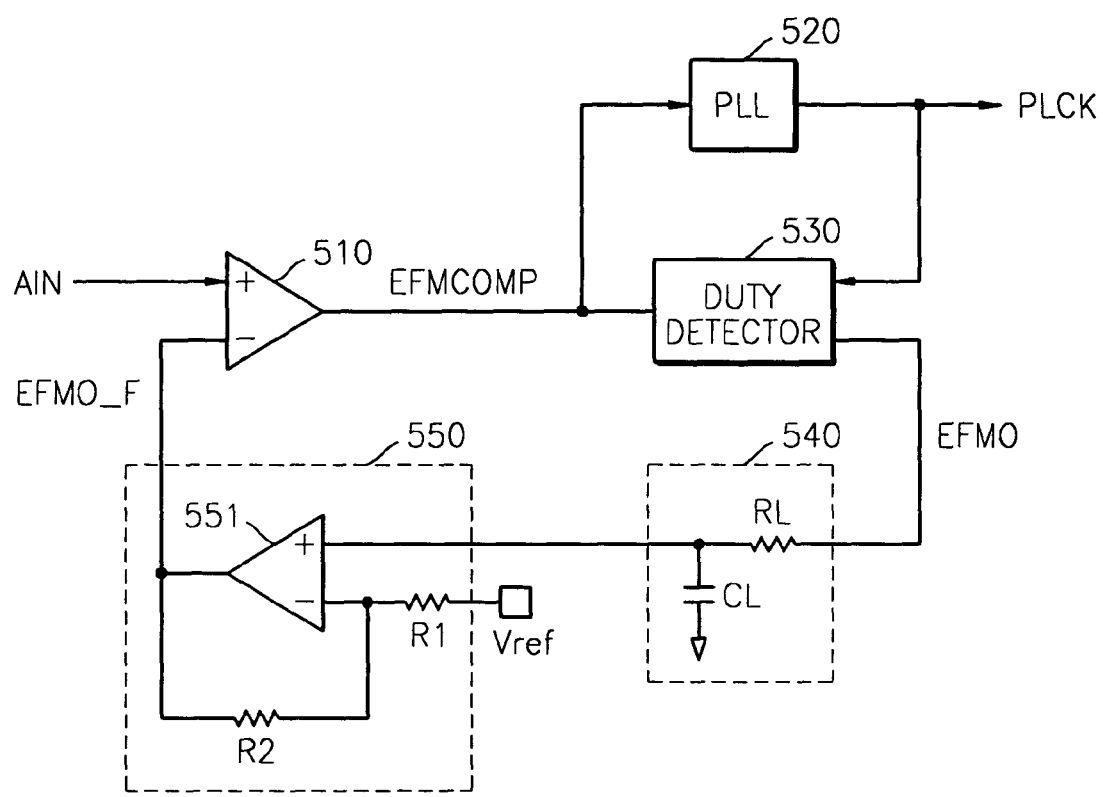
FIG. 5 is a circuit diagram of a data slicer according to one embodiment of the present invention.

FIG. 5 is a view of a data slicer according to one embodiment of the present invention. The data slicer shown in FIG. 5 includes a comparator 510, a phase locked loop (PLL) 520, a duty detector 530, a low pass filter 540, and an amplifier 550.

The comparator 510 compares an analog input signal AIN reproduced from an optical disc with a predetermined feedback signal EFMO_F to generate a digital signal EFM-COMP. If the analog input signal AIN is higher than the feedback signal EFMO_F, the comparator 510 generates a digital signal EFMCOMP at a high level. If the analog input signal AIN is lower than the feedback signal EFMO_F, the comparator 510 generates a digital signal EFMCOMP at a low level. That is, the comparator 510 functions to convert the analog input signal AIN into the digital signal EFM-COMP with a square wave pattern. A positive terminal of the comparator 510 receives the analog input signal AIN and a negative terminal receives the feedback signal EFMO_F. The feedback signal EFMO_F is used as a slice level that is a base for converting the analog input signal AIN into the digital signal EFMCOMP.

An optional high pass filter (not shown) may be placed at the front end of the positive terminal of the comparator 510 for removing low frequency noise components from the analog input signal AIN.

The PLL 520 receives the digital signal EFMCOMP to generate a predetermined channel clock signal PLCK having a predetermined channel period (to be referred to hereinafter as "T").

The duty detector 530 detects the duty cycle of the digital signal EFMCOMP. If the detected duty is shorter than the preset duration, the duty detector 530 allows the digital signal EFMCOMP to pass. On the other hand, if the detected duty is longer than the preset duration, the duty detector 530 outputs an output signal EFMO in a high impedance state Hi-z with respect to the duty beyond the preset duration. Thus, the median value of the analog input signal AIN, that is, the slice level, is estimated in response to the digital signal EFMCOMP having a duration shorter than the preset duration.

The low pass filter 540 low-pass filters the output signal EFMO of the duty detector 530. The amplifier 550 amplifies the low-pass filtered signal EFMO by a predetermined gain to generate the feedback signal EFMO_F input to the negative terminal of the comparator 510.

The low pass filter 540 functions to integrate the output signal EFMO of the duty detector 530. The low pass filter 540 includes a resistor RL and a capacitor CL. The amplifier 550 includes a differential amplifier 551 and resistors R1 and R2. The output signal of the low pass filter 540 is input to a positive terminal of the differential amplifier 551, and a predetermined reference voltage Vref is input to a negative terminal of the differential amplifier 551 via the series resistor R1. The reference voltage Vref may optionally be output by a separate reference voltage generator (not shown). The output signal of the differential amplifier 551 becomes the feedback signal EFMO_F that is input to the negative terminal of the comparator 510.

Figure 7:
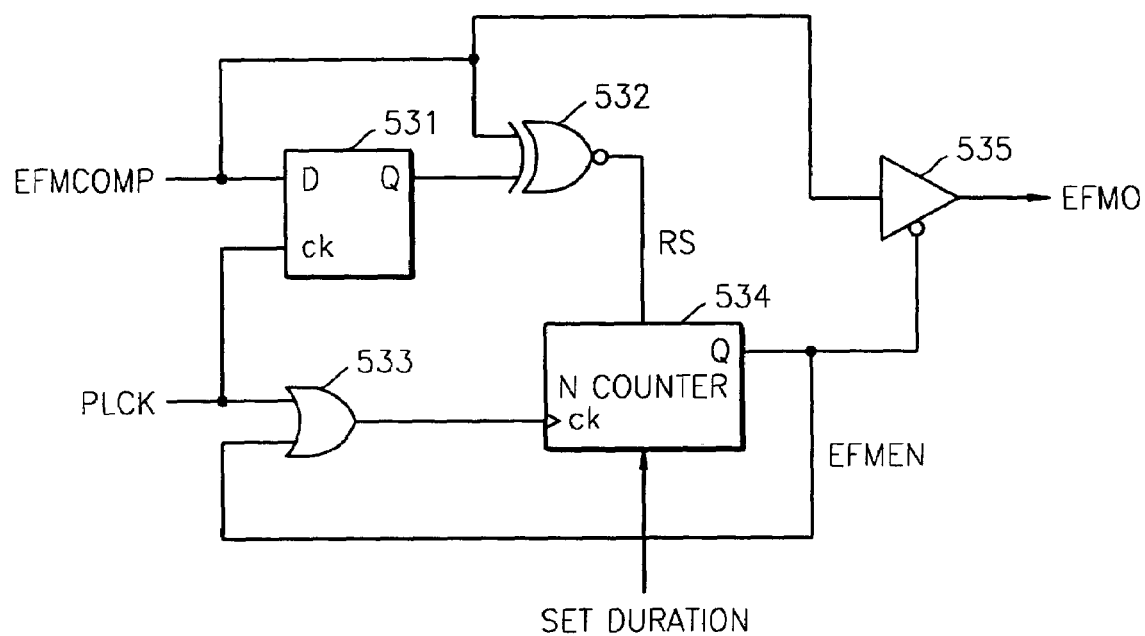
FIG. 7 is a detailed circuit diagram of a duty detector shown in FIGS. 5 and 6.

A detailed circuit diagram of the duty detector 530 in accordance with the present invention is provided in FIG. 7. As shown in FIG. 7, the duty detector 530 includes a D flip-flop 531, an exclusive NOR gate 532, an OR gate 533, a counter 534, and a tri-state buffer 535.

The digital signal EFMCOMP is input to an input terminal D of the D flip-flop 531, and the channel clock signal PLCK is inputted to a clock terminal ck of the D flip-flop 531. The D flip-flop 531 outputs the digital signal EFMCOMP after delaying the digital signal EFMCOMP by one period of the channel clock signal PLCK.

The exclusive NOR gate 532 performs an exclusive NOR operation on the digital signal EFMCOMP and the output signal of the D flip-flop 531 to generate a reset signal RS. Thus, the reset signal RS becomes a high level for one (1) channel period whenever the digital signal EFMCOMP is inverted. That is, the reset signal RS is generated whenever the digital signal EFMCOMP changes from 0 to 1 or from 1 to 0. The reset signal RS is input to the counter 534.

The OR gate 533 performs an OR operation on the channel clock signal PLCK and an output signal EFMEN of the counter 534 and inputs it to a clock terminal ck of the counter 534.

The counter 534 has a duration which is previously set, and the unit of the duration is T. For example, if a set value is N, the duration is denoted as N*T. Here, T is a channel period, and N is a natural number. Supposing that a set value is 5 in the present embodiment, the preset duration of the counter 534 is 5T.

The counter 534 resets the count value to '0' whenever the reset signal RS is generated. The counter 534 begins to count from '0'. If the count value is smaller than the set value, the counter 534 outputs an output signal EFMEN at a first logic level, and if the count value is equal to the set value, the counter 534 outputs an output signal EFMEN at a second logic level. Here, the first logic level is referred to as a low level, and the second logic level is referred to as a high level. The output signal EFMEN of the counter 534 is a buffer control signal for controlling the tri-state buffer 535.

The tri-state buffer 535 buffers the digital signal EFMCOMP in response to the output signal EFMEN of the counter 534 and outputs the buffered digital signal EFMO. When the output signal EFMEN of the counter 534 is at the first logic level, the tri-state buffer 535 becomes active and outputs the digital signal EFMCOMP. On the other hand, when the output signal EFMEN of the counter 534 is at the second logic level, the tri-state buffer 535 becomes inactive, to thereby place the buffered digital signal EFMO in a high impedance state.

Figure 8:
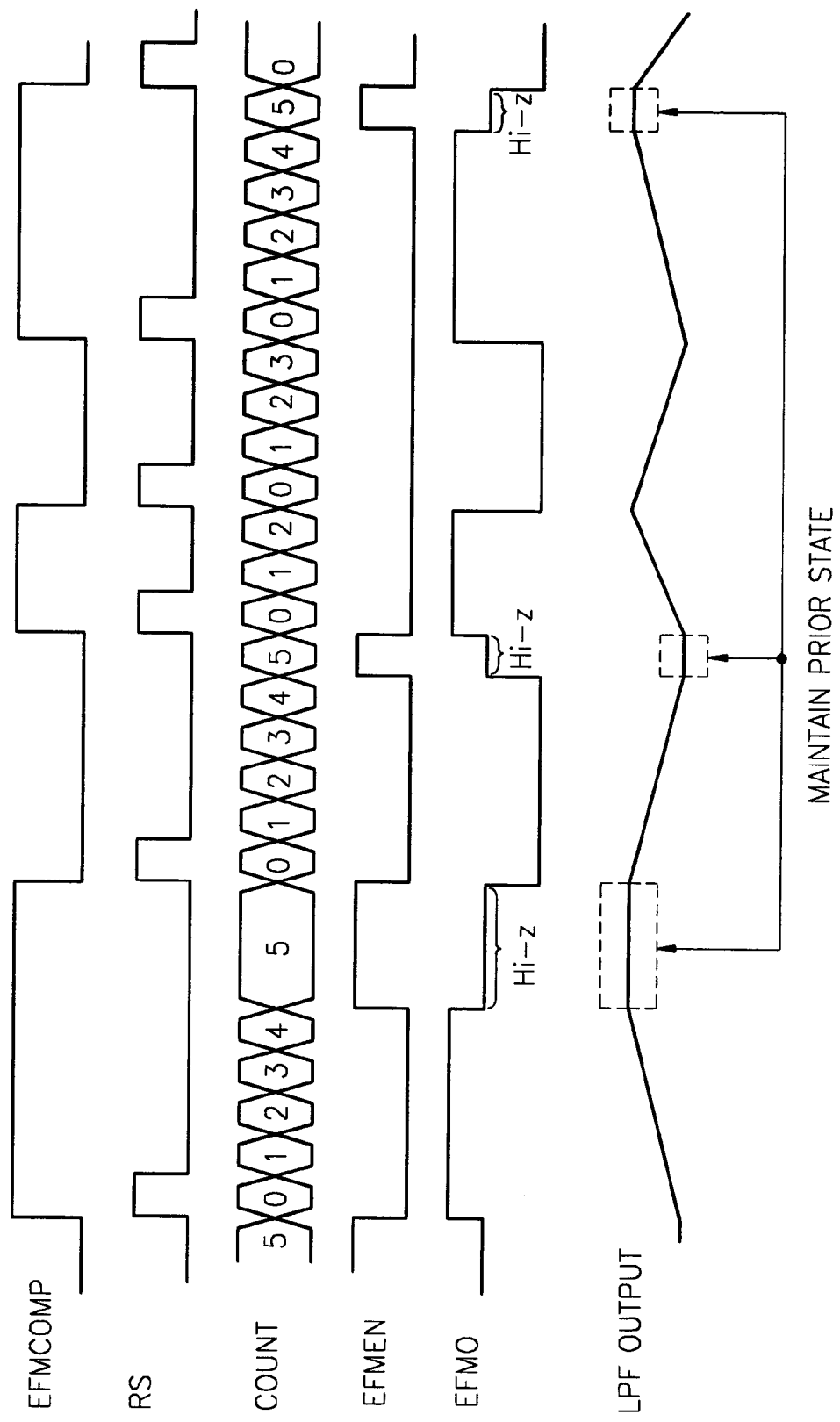
FIG. 8 is an operation waveform diagram of the duty detector shown in FIG. 7.

FIG. 8 is an operation waveform diagram of the duty detector shown in FIG. 7. The operation of the duty detector 530 will be described below with reference to FIG. 8.

As shown in FIG. 8, the digital signal EFMCOMP output by the comparator 510 is a square wave signal having logic values of '1' and '0.' Suppose, for example, that the digital signal EFMCOMP is a digital signal reproduced from a CD. As described above, a signal recorded on the CD is a signal with a period of 3T to 11T. The reset signal RS is generated in a high level state during one (1) channel period, whenever the digital signal EFMCOMP is changed from '1' to '0' and from '0' to '1.' That is, the reset signal RS has one (1) period width of the channel clock signal PLCK generated by responding to a rising edge and a falling edge of the digital signal EFMCOMP.

When the reset signal RS is generated, the counter 534 is reset to '0' and begins to count from '0.' If the count value is smaller than the value set from the counter 534, for example, 5, the output signal EFMEN of the counter 534 is in a low level state. The channel clock signal PLCK is continuously input to the clock terminal ck of the counter 534 during the time when the output signal EFMEN is in a low level state, and thus, the counter 534 continuously counts according to a channel period. If the count value is then equal to 5, the output signal EFMEN of the counter 534 is placed in a high level state. The high level signal is input to the clock terminal ck of the counter 534, and thus, the counting operation of the counter 534 is stopped. Thus, the count value is maintained at 5.

Since the tri-state buffer 535 outputs the digital signal EFMCOMP during the times when the output signal EFMEN is in a low level state, the buffered digital signal EFMO is identical with the digital signal EFMCOMP during the times when the output signal EFMEN is in a low level state. On the other hand, the inner switch of the tri-state buffer 535 is turned OFF during the output signal EFMEN being at a high level state, so that the digital signal EFMO of the tri-state buffer 535 which is buffered during times when the output signal EFMEN is in a high level state is in a high impedance state having a predetermined level.

For example, in the case where the input signal of the counter 535 is the 11T signal, the counting operation of the counter 534 is stopped. This reason is that if the input signal is the 5T signal, the output signal EFMEN of the counter 534 is in a high level state so that the high level signal is input to the clock terminal ck of the counter 534. Thus, the 11T signal is converted into a '5T+6T high impedance (Z)' signal. That is, the '5T+6T high impedance (Z)' signal means that the original digital signal is output during the 5T period and the output signal is in the high-impedance state during the remaining 6T period. On the other hand, in the case where a digital signal not longer than the 5T period is input, the original digital signal is output.

The buffered digital signal EFMO is filtered by the low pass filter 540. The low-pass filtered signal, that is, LPF output, as shown in FIG. 8, raises continuously when the buffered digital signal EFMO is '1.' Thereafter, the LPF output is maintained to the former value when the buffered digital signal EFMO is in the high impedance (Z) state. Further, when the buffered digital signal EFMO is '0', the LPF output falls continuously.

Although the preset duration of the counter is 5T in the illustrative example, the preset duration of the counter may be changed.

Figure 9:
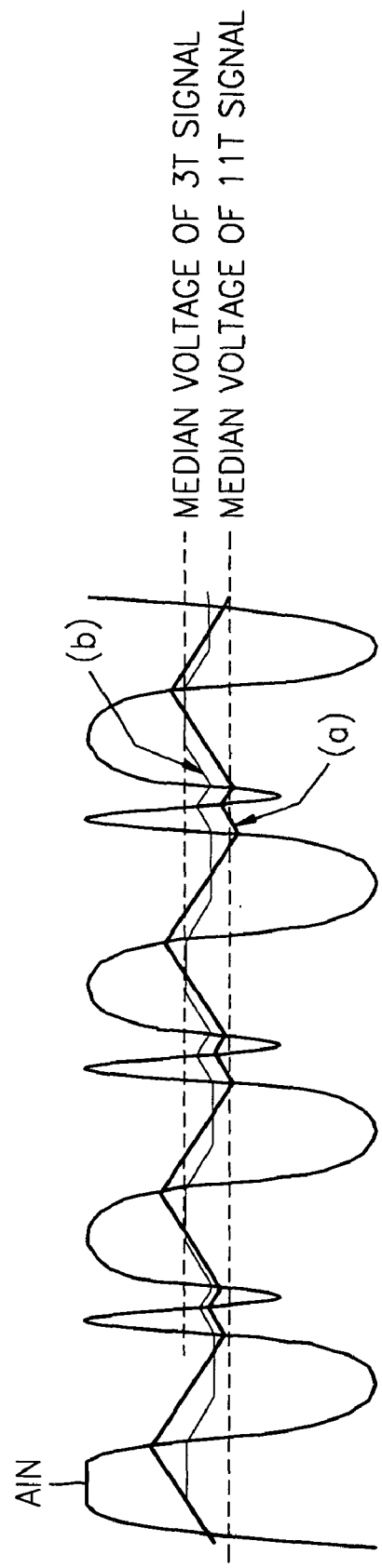
FIG. 9 is a waveform diagram of an analog input signal and a feedback signal.

FIG. 9 is a waveform diagram of the analog input signal AIN and the feedback signal. In FIG. 9, (a) represents the feedback signal FB generated in the conventional data slicer shown in FIG. 2, and (b) represents the feedback signal EFMO_F generated in the data slicer shown in FIG. 5.

Figure 2:
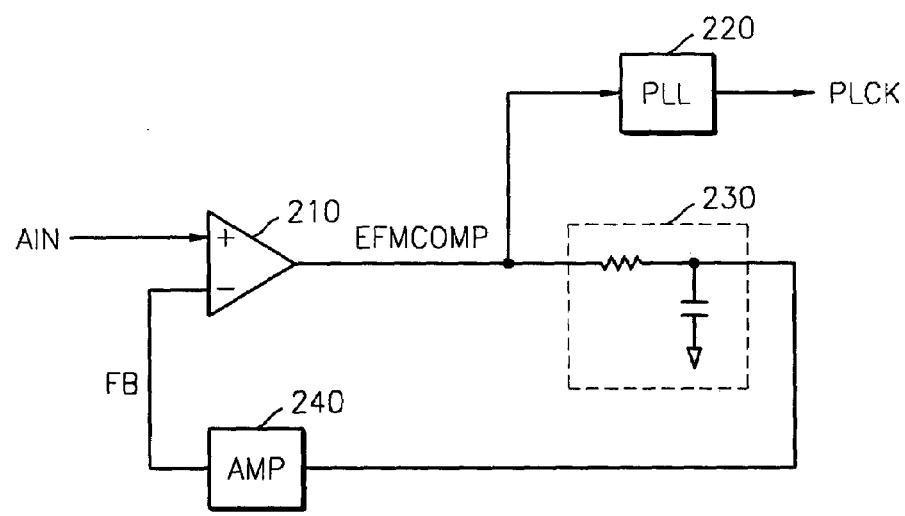
FIGS. 2 and 3 are circuit diagrams of examples of conventional data slicer circuits.
Figure 3:
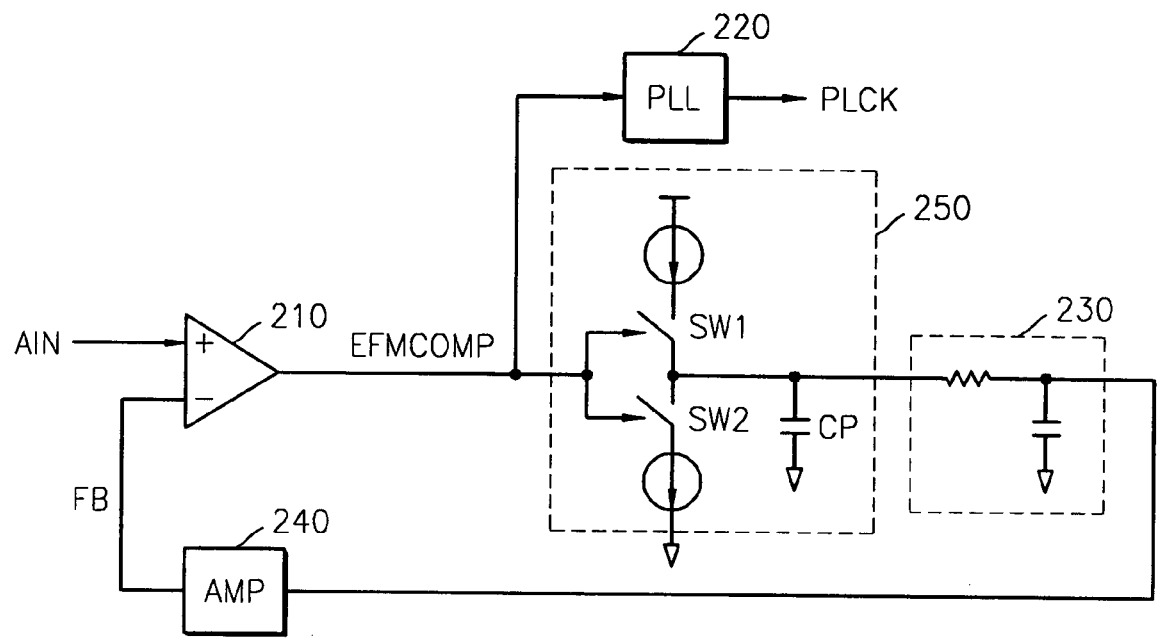
Figure 4:
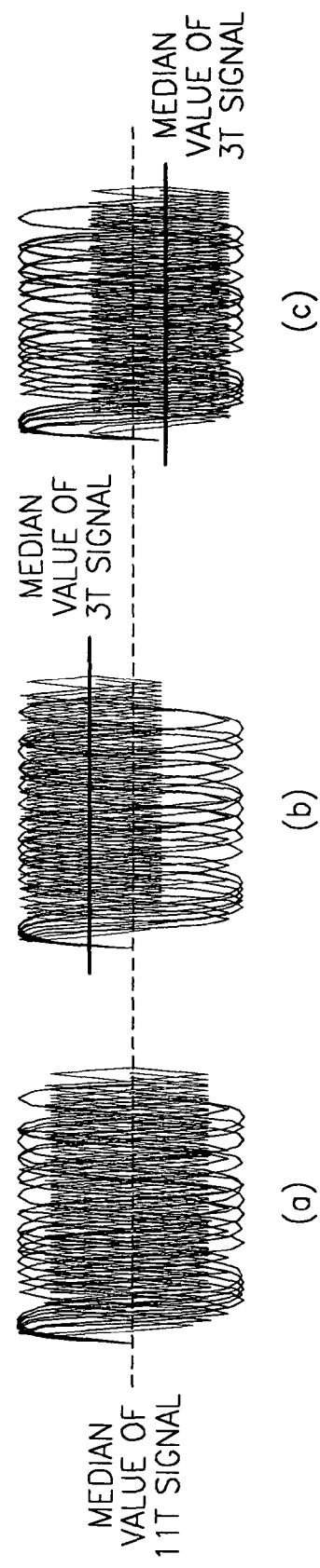
FIG. 4 is a waveform diagram of an analog input signal.

The analog input signals AIN having the same waveform are input to the data slicers shown in FIGS. 2 and 5, respectively. In the waveform of the analog input signals AIN shown in FIG. 9, the median value of the 3T signal is higher than that of the 11T signal and has a positive asymmetry. In this case, according to the conventional approach, which integrates all of signals to generate the feedback signal FB, the center of the 3T signal is not traced so that the duty of the 3T signal is distorted. As a result, a data error is generated in restoring information data. On the other hand, according to the present embodiment, since the feedback signal EFMO_F is generated by integrating signals having the preset duration, or less, it is easy to estimate the median values of the signals having the short duration. For example, in the case where the preset duration is 5T, the signals having a duration not longer than the 5T duration are integrated, and thus, the integrated value is near to the median value of the signal having the short duration.

In FIG. 9, the feedback voltage (b) across the circuit according to the present embodiment is higher than the feedback voltage (a) across the conventional circuit, and is near to the median value of the 3T signal. Thus, the probability that the duty of the signal having the shorter duration will be distorted is reduced in the present invention. Further, although the signal having the long duration is sliced using the median value of the signal having the short duration, this slicing effect is far less than in the case where the signal having the short duration is sliced using the median value of the signal having the long duration. Thus, the probability that data errors occur during the restoration of data is reduced by estimating the slice level based on the signal having the short duration.

Figure 6:
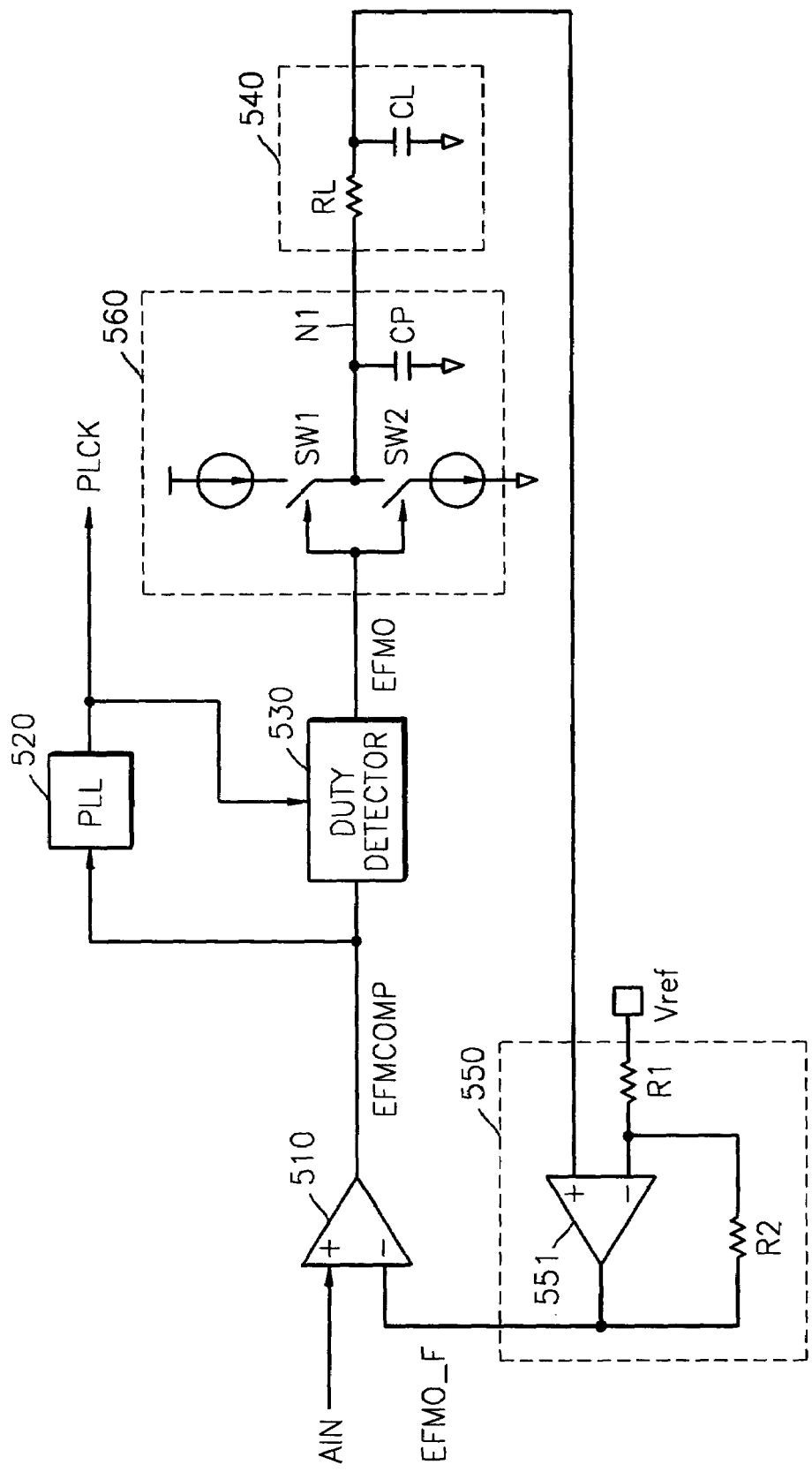
FIG. 6 is a circuit of a data slicer according to another embodiment of the present invention.

FIG. 6 is a view of a data slicer according to another embodiment of the present invention. The data slicer shown in FIG. 6 further includes a charge pump 560 in addition to a comparator 510, a PLL 520, a duty detector 530, a low pass filter 540, and an amplifier 550 included in the data slicer shown in FIG. 5. Since the operation of the comparator 510, the PLL 520, the duty detector 530, the low pass filter 540, and the amplifier 550 as described in detail above, its description will be omitted here.

The charge pump 560 includes a first switch SW1 located between a power supply voltage and an input node N1 of the low pass filter 540, a second switch SW2 located between the input node N1 of the low pass filter 540 and ground, and a capacitor CP located between the input node N1 of the low pass filter 540 and ground.

When the digital signal EFMO is at a low level, the first switch SW1 is turned ON. When the digital signal EFMO is at a high level, the second switch SW2 is turned ON. In other words, when the digital signal EFMO is at a high level, the first switch SW1 is turned OFF and the second switch SW2 is turned ON. In this case, the voltage charged to the capacitor CP is reduced because a current flows from the input node N1 of the low pas filter 540 to ground, and thus, the level of the signal input to the low pass filter 540 is lowered. When the digital signal EFMO is at a low level, the first switch SW1 is turned ON and the second switch SW2 is turned OFF. In this case, the level of the signal input to the low pass filter is increased because the capacitor CP is charged with the voltage by the current supplied from the power supply voltage. That is, the charge pump 560 functions to lower the peak-to-peak level of the buffered digital signal EFMO. Further, since the data slicer according to the present embodiment further includes the charge pump 560 of the above-described structure, the design features, particularly, the bandwidth feature of the low pass filter 540, which is connected to the back end of the charge pump 560, can be relieved.

As described above, according to the circuit and method for slicing data of the present invention, data is sliced based on a median value of a signal having a preset duration of a predetermined value or less. Thus, a probability that the duty of the signal having the short duration will be distorted is reduced compared with the conventional data slice. As a result, a probability that data errors occur during the restoration of data is reduced.

While the present invention has been particularly shown and described with reference to preferred embodiments thereof, it will be understood by those of ordinary skill in the art that various changes in form and details may be made herein without departing from the spirit and scope of the present invention as defined by the appended claims.

What is claimed is:

1. A data slicer for converting an analog input signal into a digital signal in an optical disc system, comprising:
    a comparator which compares the analog input signal with a slice level to generate a digital signal at a first level or a digital signal at a second level, in response to the comparison result;
    a duty detector which detects the duty of the digital signal when the logic level of the digital signal is changed, outputs the digital signal as an output signal when the detected duty is equal to or less than a preset duration, and outputs a signal at a third level during a period greater than the preset duration when the detected duty is greater than the preset duration; and
    a slice level estimating unit which receives the output signal of the duty detector to estimate and output the slice level.

2. The data slicer of claim 1, wherein the slice level estimating unit includes a low pass filter for integrating the output signal of the duty detector.

3. The data slicer of claim 1, wherein the duty detector includes:
    a counter which performs an counting operation and outputs a buffer control signal at a first logic level if a count value obtained by the counting operation is less than a preset value, and outputs a buffer control signal at a second logic level if the count value is not less than the preset value;
    a reset signal generator for generating a reset signal so as to reset the count value of the counter to a preset count value; and
    a tri-state buffer which outputs the digital signal as the output signal when the buffer control signal is at the third level, and places the output signal in a high-impedance state when the buffer control signal is at the second logic level.

4. The data slicer of claim 1, wherein the slice level estimating unit includes a charge pump including a capacitor between an output node of the duty detector and a ground voltage, and adjusts the voltage level of the input signal of the low pass filter by discharging or charging the voltage of the capacitor in response to the output signal of the duty detector; and
    a low pass filter for integrating the voltage level of the capacitor.

5. A data slicer for converting an analog input signal into a digital signal in an optical disc system, comprising:
    a comparator for comparing the analog input signal with a feedback signal to generate the digital signal;
    a duty detector which detects the duty of the digital signal, and if the detected duty is longer than a preset duration, converts the detected signal into a signal having the preset duration, and outputs the converted signal, wherein the duty detector includes:

a counter which performs a counting operation, and outputs a buffer control signal at a first logic level if a count value determined by the counting operation is less than a preset value and outputs a buffer control signal at a second logic level if the count value is not less than the preset value; a reset signal generator for generating a reset signal so as to reset the count value of the counter to a preset count value; and a tri-state buffer which outputs the digital signal as an output signal when the buffer control signal is at the first logic level, and places the output signal in a high-impedance state when the buffer control signal is at the second logic level; and a low pass filter for integrating the output signal of the duty detector to generate the feedback signal.

6. The data slicer of claim 5, wherein the tri-state buffer is active when the buffer control signal is at the first logic level and is inactive when the buffer control signal is at the second logic level.

7. The data slicer of claim 5, wherein the reset signal generator performs an exclusive OR operation on the digital signal and a signal obtained by delaying the digital signal by a channel clock period to generate the reset signal.

8. The data slicer of claim 5, wherein the counting operation of the counter is preformed in response to a signal obtained by performing an OR operation on a channel clock signal and the buffer control signal.

9. The data slicer of claim 5, further comprising an amplifier which amplifies the feedback signal.

10. The data slicer of claim 5, further comprising a high pass filter for removing low frequency noise components from the analog input signal.

11. The data slicer of claim 5, wherein if the analog input signal is equal to or greater than the feedback signal, the comparator outputs the digital signal at a high level, and if the analog input signal is less than the feedback signal, the comparator outputs the digital signal at a low level.

12. The data slicer of claim 5, further comprising:

a charge pump which includes a capacitor which is placed between an input node of the low pass filter and a ground voltage, and adjusts the voltage level of the input signal of the low pass filter by discharging or charging the voltage of the capacitor in response to the output signal of the duty detector.

13. The data slicer of claim 12, wherein the charge pump includes a first switch which is turned ON when the digital signal is at a low level and the capacitor is charged with the voltage, and a second switch which is turned ON when the digital signal is at a high level and the voltage of the capacitor is discharged.

14. A data slicer for converting an analog input signal into a digital signal in an optical disc system, comprising:

a comparator which compares the analog input signal with a slice level to generate a digital signal at a first level or a digital signal at a second level, in response to the comparison result;

a duty detector which detects the duty of the digital signal when the logic level of the digital signal is changed, outputs the digital signal as an output signal when the detected duty is equal to or less than a preset duration, and outputs a signal at a third level during a period greater than the preset duration when the detected duty is greater than the preset duration, wherein the duty detector includes:

a counter which performs an counting operation and outputs a buffer control signal at a first logic level if a count value obtained by the counting operation is less than a preset value, and outputs a buffer control signal at a second logic level if the count value is not less than the preset value;

a reset signal generator for generating a reset signal so as to reset the count value of the counter to a preset count value; and a tri-state buffer which outputs the digital signal as the output signal when the buffer control signal is at the third level, and places the output signal in a high-impedance state when the buffer control signal is at the second logic level; and a slice level estimating unit which receives the output signal of the duty detector to estimate and output the slice level.

15. A method for slicing data for converting an analog input signal into a digital signal in an optical disc system comprising:

(a) comparing the analog input signal with a feedback signal to generate the digital signal;

(b) detecting the duty of the digital signal, and if the detected duty is longer than a preset duration, converting the detected signal into a signal having the preset duration, and outputting the converted signal, wherein (b) includes:

(b1) performing a counting operation using a counter, outputting a buffer control signal at a first logic level if a count value determined by the counting operation is smaller than a preset value, and outputting a buffer control signal at a second logic level when the count value is not smaller than the preset value; and (b2) outputting the digital signal as an output signal when the buffer control signal is at the first logic level, and placing the output signal in a high-impedance state when the buffer control signal is at the second logic level; and (c) integrating the output signal of a duty detector to generate the feedback signal.

16. The data slicing method of claim 15, wherein (c) comprises:

(c1) integrating the output signal of the duty detector; and (c2) amplifying the integrated signal.

17. The data slicing method of claim 15, prior to (a), further comprising high-pass filtering the analog input signal for removing low frequency noise components therefrom.

18. The data slicing method of claim 15, further comprising adjusting a voltage level of an input signal of a low pass filter by discharging or charging the voltage of a capacitor in response to the output signal of the duty detector.

* * * * *